United States Patent [19]

Ruys

[11] 3,998,469
[45] Dec. 21, 1976

[54] BICYCLE WITH DRIVE LEVERS

[76] Inventor: Frans Willem Ruys, Utrechtseweg 19, De Bilt, Netherlands

[22] Filed: Apr. 21, 1975

[21] Appl. No.: 570,087

[30] Foreign Application Priority Data

Apr. 23, 1974 Netherlands ............... 7405462

[52] U.S. Cl. ............................................. 280/254
[51] Int. Cl.² ........................................... B62M 1/04
[58] Field of Search .......... 280/253, 254, 255, 257, 280/258, 245

[56] References Cited

UNITED STATES PATENTS

| | | | |
|---|---|---|---|
| 1,148,419 | 7/1915 | White | 280/254 |
| 3,834,733 | 9/1974 | Harris | 280/251 |

FOREIGN PATENTS OR APPLICATIONS

| | | | |
|---|---|---|---|
| 582,282 | 12/1924 | France | |
| 555,750 | 7/1932 | Germany | 280/254 |
| 623,639 | 5/1949 | United Kingdom | 280/253 |

*Primary Examiner*—Kenneth H. Betts
*Attorney, Agent, or Firm*—Kenyon & Kenyon

[57] ABSTRACT

Bicycle provided with two drive levers which each carry a pedal at one end and which, by means of a pivot, are connected pivotally about a pivot axis transversely to the riding direction to the bicycle, synchronization coupling means operative between the two levers to force same to execute their pivoting movements synchronously and in opposite rotation sense, there being disposed between each lever and the rear wheel of the bicycle a one-directional coupling for coupling the levers upon their downward pivotal movement for forward bicycle drive with the rear wheel, wherein coupling means, through coacting portions such as enmeshing teeth, couple the levers for the bicycle drive and/or for the synchronous pivotal movement in opposite sense of rotation.

7 Claims, 7 Drawing Figures

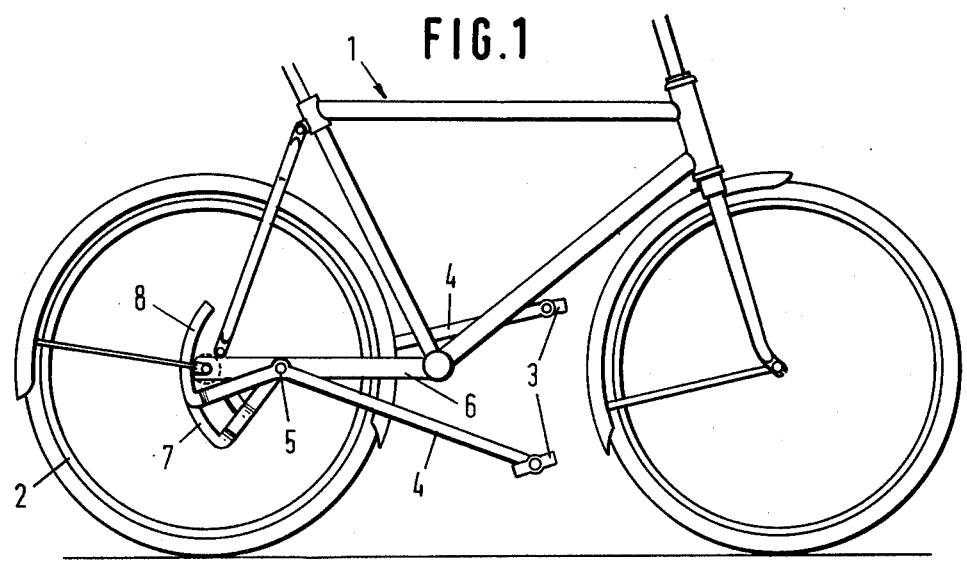
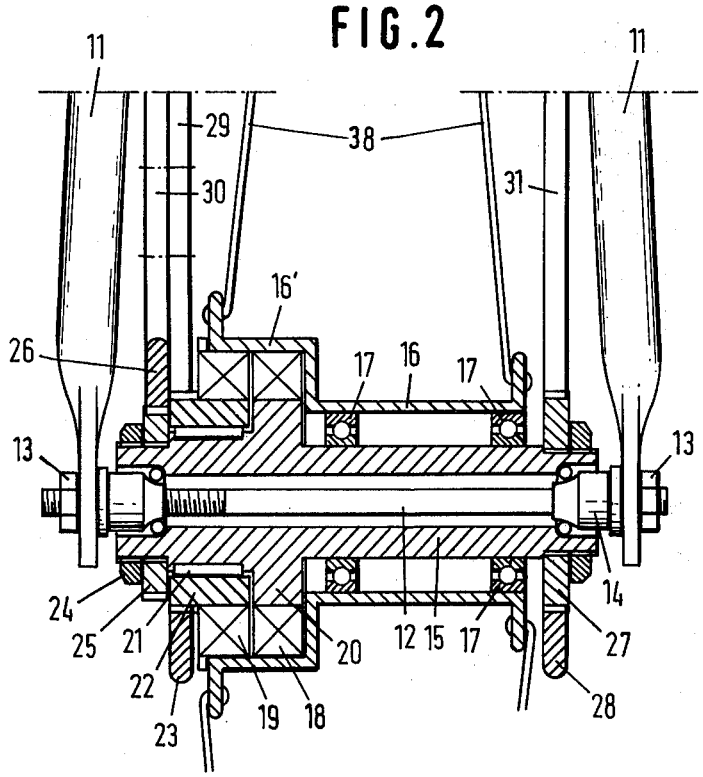

BICYCLE WITH DRIVE LEVERS

The invention relates to a bicycle provided with two drive levers which each carry a pedal at one end and which, by means of a pivot, are connected pivotally about a pivot axis, transversely to the riding direction, to the bicycle, synchronisation coupling means operative between the two levers to force same to execute their pivoting movements synchronously and in opposite rotation sense, there being disposed between each lever and the rear wheel a one-directional coupling for coupling the levers upon their downward pivotal movement for forward bicycle drive with the rear wheel. It is an object of the present invention to improve this bicycle so that there is obtained a lever drive providing maximal efficiency, reliable operation, inexpensive design and a compact construction, as well as an effective arrangement of the transmission and coupling means.

The above bicycle in the embodiment according to the invention is provided with coupling means which, by means of coacting portions such as enmeshing teeth, couple the levers for the bicycle drive and/or for the synchronous pivotal movement in opposite sense of rotation.

The principle of the invention can be applied in a varied way. Some embodiments of the invention will now be described by way of example, with reference to the accompanying drawings, wherein FIG. 1 is a side view of a bicycle according to the invention;

FIG. 2 a cross section in a plane wherein the axis of the rear wheel is positioned;

Figure 3:
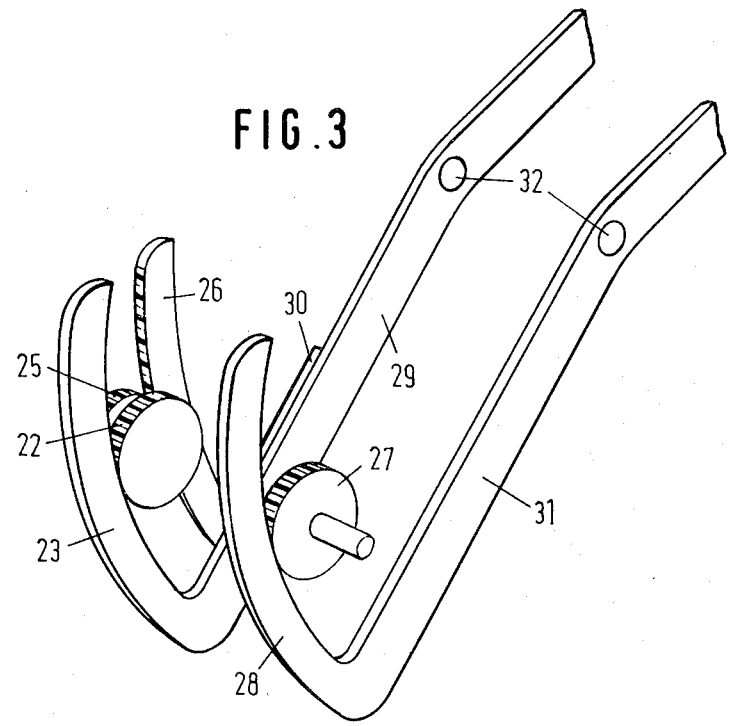
FIG. 3 is a perspective view of the arrangement of the gears and levers of the embodiment shown in FIG. 2.

In FIG. 1 the bicycle 1 is provided with a rear wheel 2 which is driven by levers 4 carrying pedals 3, said levers being pivotally connected at 5 to the frame 6. The levers 4 carry gear segments 7 and 8 enmeshing the gears, each connected to a one-directional coupling of the hub of the wheel 2, so that the alternately downwardly moving levers 4 can drive the wheel.

In the embodiment shown in FIGS. 2 and 3, 11 are the rear fork ends of the bicycle frame wherebetween there is secured a fixed shaft 12 with nuts 13 and ball-bearing rings 14, whereabout the ball-bearing bush 15 is rotatable. Around the bush 15 is rotatable the wheel hub 16 by means of ball bearings 17. The wheel hub 16 has terminal collars to which are connected the wheel spokes 38. The wheel hub 16 has a larger diameter portion 16' accommodating two sets of one-directional coupling elements 18, 19. The elements 18 are adapted to couple the hub 16',16 and a collar 20 of the bush 15. The elements 19 are adapted to couple the hub 16',16 with a gear 22 mounted via needle bearing rollers 21 on the bush 15, the teeth ring of said gear 22 being in engagement with a gear segment 23. Beside the gear 22, a gear 25 is connected relatively non-rotatably to bush 15, by means of a nut 24 and key grooves, said gear 25 enmeshing with a gear segment 26. At the other end of the bush 15 there is identically connected therewith a gear 27 which is in engagement with a gear segment 28. The gears 22 and 27 have an identical pitch circle diameter, the gear 25 a smaller diameter. The gear segment 23 is carried by the drive lever 29 to which likewise is connected the gear segment 26 via the square portion 30. The wheel segment 28 is fixedly connected to the drive lever 31. The levers 29 and 31 are coupled for synchronous opposite pivotal movement about the pivots 32 by gears 25 and 27 connected by the bush 15. The drive of the hub 16 is effected via gears 27 and 22 and the one-directional couplings 18,19.

Figure 4:
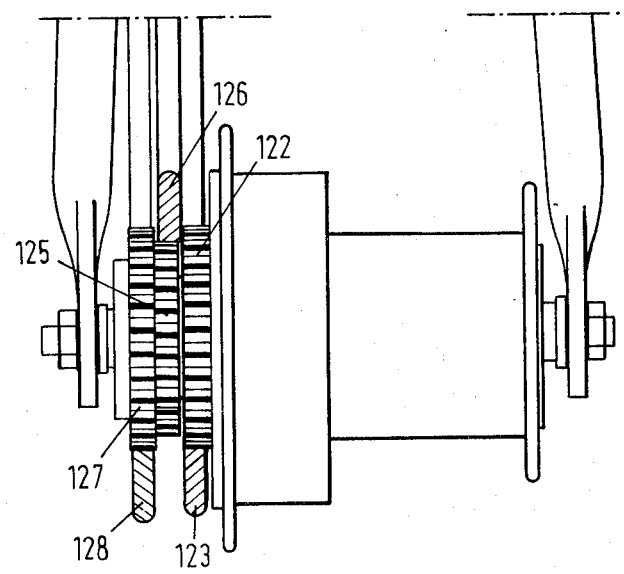
FIG. 4 is a top view of the rear wheel hub of a different embodiment wherein a cross section of the gear segments is shown.
Figure 5:
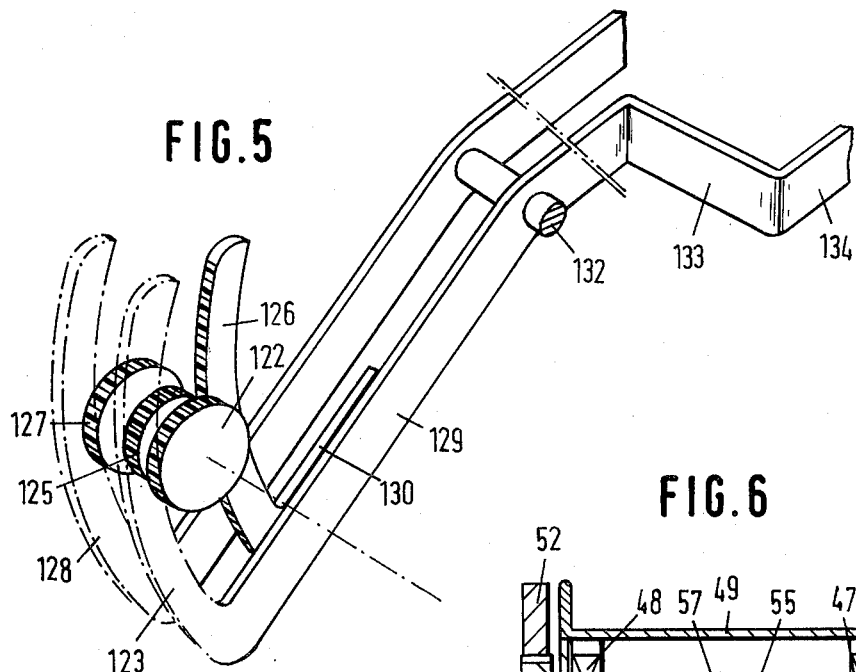
FIG. 5 is a perspective view of the arrangement of the gears and levers of the embodiment shown in FIG. 4.

FIGS. 4 and 5 show an embodiment differing from the embodiment of FIGS. 2 and 3 in that all gears are positioned at one side of the wheel, like the gear segments. The gears and gear segments corresponding in function with those shown in FIGS. 2 and 3 are indicated by the same reference numerals, however increased by a hundred.

Figure 7:
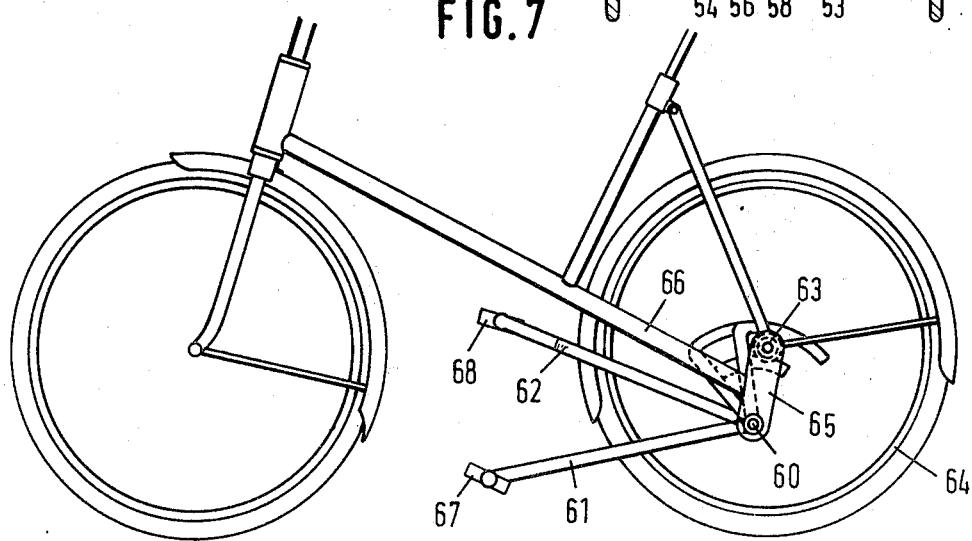
FIG. 7 shows a bicycle according to the invention having an arrangement of the drive levers modified with respect to FIG. 1.

FIG. 5 shows a pivot pin 132 common to the levers 129, 131, which pin is attached to a frame rod adjacent the rear wheel as for example, frame member 66 of the bicycle frame design shown in FIG. 7. The pivot may be arranged on member 66 in FIG. 7, at approximately the same place as pivot point 5 in FIG. 1. The lever 129 on the left hand side of the bicycle is connected to portion 134 on the right hand side, by transverse intermediate portion 133. The latter passes in front of the rear wheel 64. Portion 134 carries the pedal on the right-hand side of the bicycle.

Figure 6:
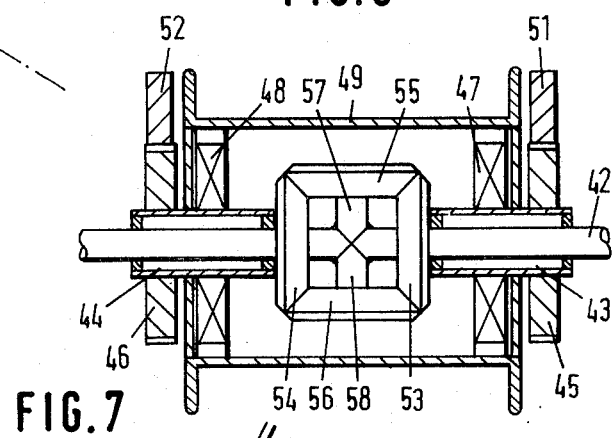
FIG. 6 shows still another embodiment of the hub of the rear wheel in a cross-sectional area wherein the wheel axis is positioned.

In FIG. 6 42 represents a fixed shaft clamped in rear fork ends not shown. Rotatably mounted about the shaft 42 are two bushes 43,44, each connected to a gear 45,46, and to part of a one-directional coupling 47,48, which couplings are adapted to provide drive connection with the wheel hub bush 49 mounted on the bushes 43,44. Enmeshing with the gears 45,46 are gear segments 51,52 which are each connected to one of the two drive levers not shown. At the facing ends of the bushes 43,44 are connected conical gears 53,54, forming part of a differential whose gears 55,56 are the satellite wheels which are rotatable about the cross axles 57,58 fixedly connected to the fired shaft 42. The differential 53–58 forces the gears 45,46 to simultaneous opposite rotation, entraining alternately the hub 49 in one of the rotation directions.

In the bicycle shown in FIG. 7 there are applied drive levers and gear means one of the above described types, however with the pivot pins 60 of the drive levers 61,62 being positioned approximately underneath the shaft 63 of the rear wheel 64. The pivot pins 60 and the wheel shaft 63 are attached to cross pieces 65 of the frame fork ends 66. Naturally it is also possible to employ the bearing of the levers as described in connection with FIG. 5.

Through the location of the pivots of the drive levers as shown in FIG. 7 it is possible to choose a more favourable path of motion of the pedals 67,68 for the rider than with the known location of these pivots at higher level and in fronter position. Further variations are possible in the realization of the invention, such as adjustability of the location of the pedals along the drive levers for modifying the "acceleration" of the bicycle drive. It is also possible to have both gear segments connected to only one of the drive levers on either side of the wheel shaft effect the wheel drive, one of the levers providing the drive force via the other by means of a synchronisation coupling providing opposite movement. It is likewise possible to replace gear transmissions by friction means or chain and chain wheel means.

I claim:

1. In a bicycle comprising a frame including a pair of forked rear portions, a shaft, a rear wheel provided with a hub, a first and second drive lever, said levers being pivotally connected to said frame for oscillatory movement about a pivot axis transverse to the riding direction of the bicycle, transmisson means for drivingly coupling said levers to said rear wheel, and synchronization means for continuously connecting said levers for synchronous pivotal movement in opposite sense of rotation wherein the improvement is comprised of
  a. said transmission means including
     i. a first gear segment on each of said drive levers and a second gear segment on only one of said levers,
     ii. two one-directional couplings rotatably mounted about said shaft, each of said couplings including a driving part and a coupling element, each of said driving parts having fixedly connected thereto a gear wheel for enmeshing a respective one of said first gear segments, said coupling elements connected to said hub whereby the driving force applied to each of said driving parts is transmitted to said hub such that said hub is rotated in a sense compatible with the riding direction of the bicycle,
  b. said synchronization means including, a second gear wheel fixedly connected to the driving part of one of said one-directional couplings and enmeshing said second gear segment, said second gear segment on the one drive lever and the first gear segment on the other drive lever being arranged at diametrically opposite sides of said shaft whereby said synchronous pivotal movement in opposite sense of rotation is achieved, and
  c. clamping means for fixedly connecting said shaft to each of said forked rear portions, whereby all of said gear wheels are disposed between said forked rear portions.

2. The bicycle according to claim 1 wherein the driving part of one of said one-directional couplings is rotatably mounted on the driving part of the remaining one-directional coupling.

3. The bicycle according to claim 1, characterized in that the drive levers and said gear wheels are positioned at the same axial side of the rear wheel.

4. The bicycle of claim 3 wherein said drive levers are pivoted on one and the same pivot axis.

5. The bicycle according to claim 1, characterized in that the pivot of the drive levers is positioned substantially underneath the axis of the rear wheel.

6. The bicycle according to claim 1 wherein both one-directional couplings are positioned in the same axial terminal portion of the hub of the rear wheel.

7. In a bicycle comprising a frame including a pair of forked rear portions, a shaft, a rear wheel provided with a hub, a first and second drive lever said levers being pivotally connected to said frame for oscillatory movement about a pivot axis transverse to the riding direction of the bicycle, transmission means for drivingly coupling said levers to said rear wheel, and, synchronization means for continuously connecting said levers for synchronous pivotal movement in opposite sense of rotation wherein the improvement is comprised of,
  a. said transmission means including a gear segment on each of said drive levers,
     i. two one-directional couplings rotatably mounted about said shaft, each of said couplings including a driving part and a coupling element, each of said driving parts having fixedly connected thereto a gear wheel for enmeshing a respective one of said gear segments, said coupling elements connected to said hub whereby the driving force applied to each of said driving parts is transmitted to said hub such that said hub is rotated in a sense compatible with the riding directon of the bicycle,
  b. said synchronization means including,
     i. a bevel gear on the axially inner ends of each of said driving parts of said couplings,
     ii. an axle transverse to said shaft and connected thereto between said bevel gears, and
     iii. at least one reversing bevel gear rotatably mounted on the axis of said axle and engaging said bevel gears on said driving parts, whereby said synchronous pivotal movement in opposite sense of rotation is achieved, and
  c. clamping means for fixedly connecting said shaft to each of said forked rear portions whereby all of said gear wheels are disposed between said forked rear portions.

* * * * *